United States Patent Office 2,760,590
Patented Aug. 28, 1956

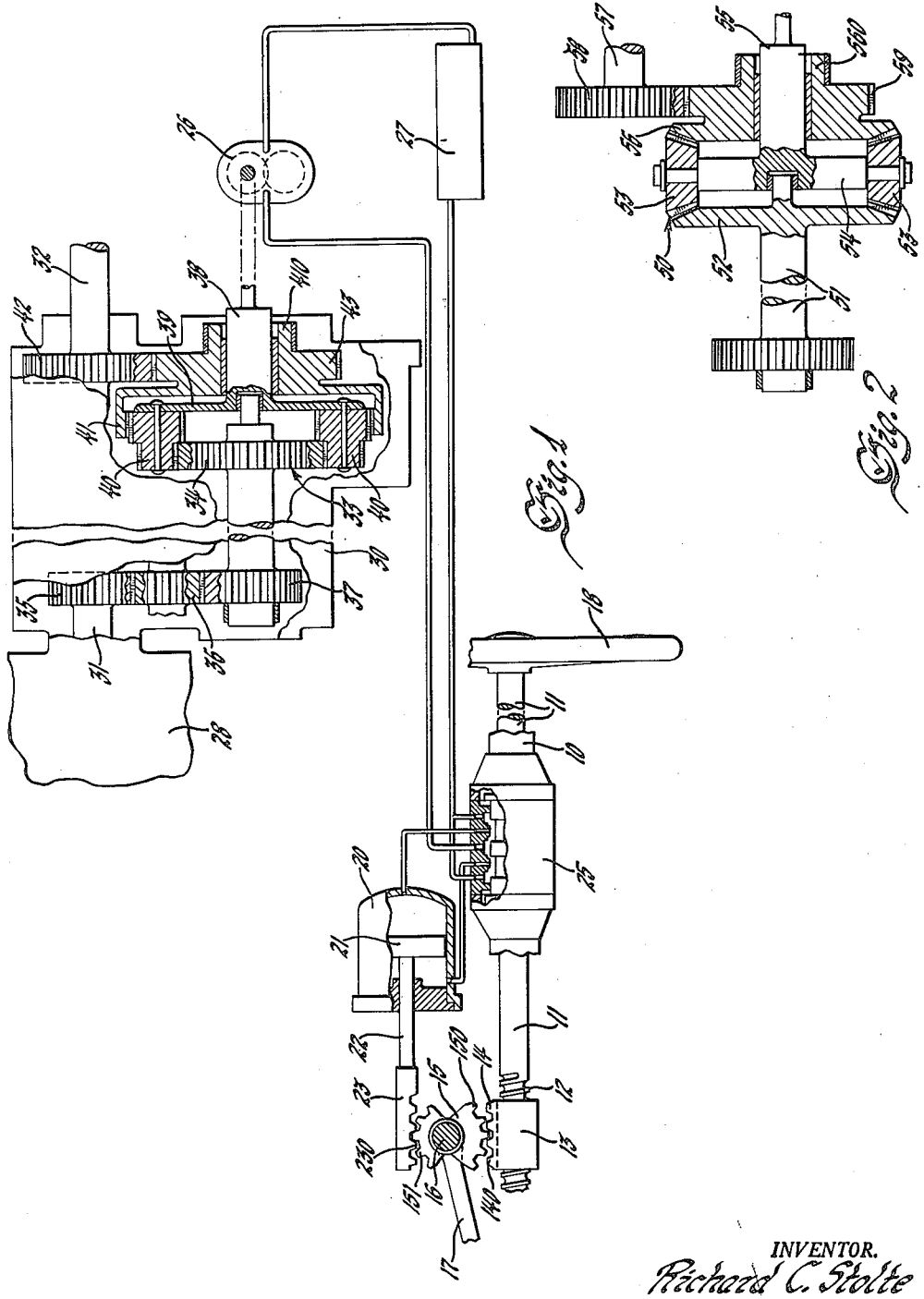

2,760,590

HYDRAULIC POWER STEERING IN WHICH THE POWER IS INVERSELY PROPORTIONAL TO VEHICLE SPEED

Richard C. Stolte, Birmingham, Mich., assignor to General Motors Corporation, Detroit, Mich., a corporation of Delaware Application January 29, 1952, Serial No. 268,749

4 Claims. (Cl. 180—79.2)

This invention relates to improvements in hydraulic power steering for motor vehicles and in particular to an improved method and means for modulating the hydraulic power steering effort applied to vehicle steering gear by hydraulic power steering mechanisms whereby to vary the power steering effort inversely in respect to the speed at which the vehicle is driven.

Some types of hydraulic steering mechanisms apply power steering effort to the vehicle steering gear at all times responsive to the turning of the steering wheel from its straight forward car travel position, while other types of hydraulic steering mechanisms apply power steering effort to the vehicle steering gear only after a predetermined amount of manual steering effort is applied to the steering wheel to steer the vehicle.

The same power steering effort is applied to the vehicle steering gear through such hydraulic power steering mechanisms whether the vehicle is standing still or being driven at a high rate of speed, which is not desirable or necessary inasmuch as the steering effort required to steer the vehicle becomes less as the speed of travel of the vehicle increases. In other words, when a vehicle is being parked or driven at slow speeds, maximum resistance to the steering thereof exists. When the vehicle is being driven at high speeds, minimum resistance to the steering thereof exists.

Since the manual steering gear provided on motor vehicles is generally entirely adequate at high vehicle speeds and consequently no power steering effort is required at high vehicle speeds, the gradual reduction of the hydraulic power steering effort available for application to the vehicle steering gear from a maximum at zero vehicle speed to a lesser amount or zero at high vehicle speeds in accordance with the present invention results in a saving of engine horsepower.

With the foregoing in view, the primary object of the invention is to provide an effective and positive method and means for modulating hydraulic steering effort available for application to and applied to the steering gear of motor vehicles dependent in degree upon the speed at which the vehicle is driven.

Another object of the invention is to provide in hydraulic power steering mechanisms for motor vehicles means for applying power steering effort to the steering gear inversely proportional to the speed at which the vehicle is driven.

Another object of the invention is to provide means employable in hydraulic power steering mechanisms for motor vehicles for applying maximum power steering effort to the steering gear when the vehicle speed is zero and decreasing the application of the said power steering effort responsive to increase in vehicle speed.

Another object of the invention is to provide means for the supplying of hydraulic fluid under pressure to the hydraulic power steering mechanism of a motor vehicle at a predetermined pressure when the vehicle speed is zero and decreasing said pressure responsive to increase in vehicle speed.

Another object of the invention is to provide simple, effective and positive means to supply hydraulic fluid under pressure to the hydraulic power steering mechanism of a motor vehicle at pressures inversely proportional to the speed at which the vehicle is driven.

Another object of the invention is to provide a source of hydraulic fluid under pressure for motor vehicle hydraulic power steering mechanism driven by the vehicle engine at an engine driven shaft speed in which the pressure is modified responsive to the speed at which the vehicle is driven.

Another object of the invention is to provide in a hydraulic power steering system for motor vehicles a source of hydraulic fluid under pressure for the hydraulic power steering mechanism at pressures proportionate to engine speeds modified by the propeller shaft speed of the vehicle when the vehicle is in motion whereby to apply maximum power steering effort at zero vehicle speed and proportionately less power steering effort as the vehicle speed increases.

Other objects will become apparent by reference to the following detailed description taken in connection with the accompanying drawings, in which:

Fig. 1 is a more or less diagrammatic view of a hydraulic power steering mechanism illustrative of the invention.

Fig. 2 shows an alternative construction that may be employed in hydraulic power steering mechanisms in practicing the invention.

Referring now to the drawing wherein like reference characters refer to like and corresponding parts throughout the several views, the invention is disclosed in Fig. 1 in connection with one of many types of hydraulic power steering mechanisms with which it may be employed. The hydraulic power steering mechanism shown in the drawing is applicable to conventional forms of manual steering gear comprising, for example, a steering column 10 having a steering shaft 11 turnable therein and worm threaded at its lower end at 12 to accommodate a thrust nut 13 onto one side of which a toothed rack 14 is formed, the teeth 140 of the said toothed rack 14 being meshed with the teeth 150 of a pinion gear 15 which is fixed to a pitman shaft 16 onto which a pitman arm 17 is keyed. The pitman arm 17 is connected in any usual manner to other elements of the steering gear, not shown, which elements are employed to transmit steering effort to the front wheels of the motor vehicle. In manual steering, steering effort is applied to the pitman arm 17 through steering mechanism such as that just described by manually turning the steering wheel 18 splined on the upper end of the steering shaft 11.

Hydraulic power steering is applied to the vehicle steering gear by means of a double acting hydraulic power cylinder 20 having a piston 21 and a piston rod 22 including a toothed power rack 23 fixed on the end thereof, the teeth 230 of the said toothed power rack 23 mesh with pinion teeth 151 formed on the pinion gear 15 opposite the pinion teeth 150 thereof. Although not shown in Fig. 1, it is obvious that the steering column 10 and the double acting hydraulic power cylinder 20 are fixedly mounted in respect to the vehicle frame, and the pitman shaft 16 is journaled on bearings fixedly supported on or in respect to the vehicle frame. A suitable hydraulic steering control valve 25 which may be mounted on the steering column 10 is operable responsive to the manual steering of the steering wheel 18 and applies hydraulic power steering effort to the steering gear through the power steering mechanism by directing hydraulic fluid under pressure from a hydraulic pressure fluid system to the double acting hydraulic power cylinder 20 on either one side or the other of the piston 21 thereof according to the direction to which the vehicle is steered by the driver thereof.

The hydraulic pressure fluid system employed to supply hydraulic fluid under pressure to the power cylinder 20 through the hydraulic steering control valve 25 generally comprises an engine driven hydraulic pump 26 and a hydraulic fluid reservoir 27, the said pump 26 preferably having built therein a suitable relief valve to maintain the fluid pressure in the hydraulic pressure fluid system at the required fluid pressure to operate the hydraulic power steering mechanism, for example, 750 p. s. i. The hydraulic pump 26 is preferably of a capacity to supply hydraulic fluid under sufficient pressure to operate the hydraulic power steering mechanism when the motor vehicle engine 28 is running at idle speed. Thus, whenever the engine of the vehicle is running, the hydraulic power steering mechanism is operable responsive to actuating the control valve 25 by turning the steering wheel 18.

Under the normal conditions hereinbefore described, it is obvious that the maximum hydraulic power steering effort from the hydraulic power steering mechanism is available at all times when the vehicle engine is running regardless of whether the vehicle speed is zero or the vehicle is being driven at its maximum speed. As previously indicated, this represents a waste of horsepower because at relatively high vehicle speeds the vehicle can be steered manually without undue effort.

The invention herein disclosed provides a simple, inexpensive and effective method and means for modulating the power steering effort in motor vehicle hydraulic power steering mechanisms for application to the steering gear of the vehicle inversely proportional to the speed at which the vehicle is driven, which now will be described, and which is applicable to other types of hydraulic power steering mechanisms than shown and described herein for illustrative purposes.

As illustrated in Fig. 1, when the vehicle speed is zero, the pump 26 is driven at engine speeds or at speeds directly related to engine speeds from the transmission input shaft 31 of a transmission unit indicated by the numeral 30. The output shaft 32 of the transmission 30 is coupled in any usual manner, not shown, to the vehicle propeller shaft for driving the vehicle. Planetary gearing generally designated by the numeral 33 located within the transmission 30 or adjacent thereto is employed to drive the pump 26 at engine speeds or at speeds directly related to engine speeds when the vehicle speed is zero, and at modified speeds when the vehicle is in forward motion. To accomplish the foregoing, the sun gear 34 of the planetary gearing 33 is driven from the transmission input shaft 31 through a suitable gear train 35, 36 and 37. The shaft 38 of the planetary pinion carrier 39 having planetary pinions 40 thereon in mesh with the internal gear 41 and in mesh with the sun gear 34 is journaled through the hub 410 of the internal gear 41, and drives the pump 26. The output shaft 32 of the transmission 30 is geared to the internal gear 41 by a suitable gear train 42 and 43, the gear 43 being shown as formed integral with the hub 410 of the internal gear 41.

When the engine is running at idling speed, and the vehicle is not in motion, the pump 26 is driven by the sun gear 34, the planetary pinions 40 and the planetary pinion carrier 39 at sufficient speed to supply the maximum hydraulic fluid pressure required to operate the hydraulic power steering mechanism. When the vehicle is driven forward, the internal gear 41 is rotated in a direction opposite to the rotation of the sun gear 34. Therefore, the forward speed of the vehicle reduces the speed of the pump 26. Accordingly, as the vehicle speed increases in proportion to the speed of the engine, the speed of the pump 26 decreases, and the pressure from the pump 26 to the hydraulic power stering mechanism progressively decreases as the speed of the vehicle increases.

Obviously, by selecting suitable gear ratios between the input shaft 31 and the planetary gearing 33, within the planetary gearing 33, and between the output shaft 32 and the planetary gearing 33, any desired pump speed may be obtained when the vehicle speed is zero and the engine is running at idling speed, and any desired progressive reduction from pump speed may be attained responsive to forward speed of the vehicle. Since the hydraulic fluid pressure available to operate the hydraulic power steering mechanism is a function of pump speed, such variation in pump speed is resolved into hydraulic power steering effort applicable to the hydraulic power steering mechanism, which power steering effort is inversely proportional to the speed at which the vehicle is driven.

Fig. 2 illustrates an alternate construction wherein side gear shaft 51 of a differential unit 50 is driven by the engine at engine speeds or at speeds directly related to engine speeds. The side gear shaft 51 of the differential unit 50 has the side gear 52 thereon. The pinion gears 53 are mounted on the pinion spider 54 preferably formed integral with the spider shaft 55 which is journaled through the hub 560 of the other side gear 56 of the differential unit 50 and drives the pump 26. The side gear 56 is rotated responsive to vehicle speed by such means as a shaft 57 through a gear train 58 and 59, the gear 59 being formed integral with the hub 560 of the side gear 56. The said gear 58 mounted on the shaft 57 may rotate at vehicle propeller shaft speed or a speed related to vehicle speed.

It is obvious that the pump 26 may be located elsewhere than in or adjacent the vehicle transmission if desired, and that the location of the power take-off from the engine to drive the said pump 26 at engine speeds or at speeds related to engine speeds is optional. Also, the modification take-off for causing the pump 26 to be driven at modified speeds may be made at any suitable location provided the said modification take-off rotates at speeds related to vehicle speed, for example, the speed of rotation of the propeller shaft driving the vehicle. The novel feature and object of the invention is the modulating of the hydraulic power steering effort in hydraulic power steering mechanisms by varying or reducing the fluid pressure in the hydraulic fluid system therefor from a maximum when the vehicle speed is zero to a fluid pressure proportionate or related to the propeller shaft speed or the speed at which the vehicle is driven. The invention herein disclosed may be accomplished in many ways either with change-speed gear transmissions or torque converter type transmissions, and with other arrangements and expedients than those shown in the drawings which are known in the art to vary the output of one driven member by progressively cancelling the effect thereof by another driven member. The importance of the invention is that it provides, in hydraulic power steering mechanisms, a flexibility of results in the form of safe vehicle steering control at high vehicle speeds through the medium of making available to the driver progressively less hydraulic steering effort as vehicle speeds increase from zero or low vehicle speeds, and, at the same time, the maximum degree of power steering effort being available when the vehicle speeds are low or zero.

Although but one embodiment of the invention and one modification thereof are disclosed and described herein, it is obvious that many variations may be made in the method and means for practicing the invention and that many modifications may be in the size, shape, arrangement and composition of the several elements thereof, all without departing from the spirit and scope of the invention as defined by the appended claims.

I claim:

1. Apparatus for modulating the effect of a hydraulic power steering system including a pump having a drive shaft and a power cylinder or the like supplied by said pump and linked to the steering elements controlling the dirigible wheels of the steered vehicle, which apparatus comprises planetary gearing through which the drive shaft of the pump is operatively connected to the drive shaft of the engine of the vehicle and to the output shaft of the vehicle transmission, said gearing being related and arranged to the end that with the vehicle in motion the pump is driven at a rate inversely proportional to the rate of rotation of the said output shaft.

2. Apparatus for modulating the effect of a hydraulic power steering system including a pump having a drive shaft and a power cylinder or the like supplied by said pump and linked to the steering elements controlling the dirigible wheels of the steered vehicle, which apparatus comprises differential gearing through which the drive shaft of the pump is operatively connected to the drive shaft of the engine of the vehicle and to the output shaft of the vehicle transmission, said gearing being related and arranged to the end that with the vehicle in motion the pump is driven at a rate inversely proportional to the rate of rotation of the said output shaft.

3. In an automotive vehicle equipped with power steering apparatus including a fluid motor operably connected to a steering part, a pump having a capacity which increases with an increase in its speed and arranged to supply pressure fluid to said motor, a drive for said pump operatively connected to the vehicle engine, power take-off means connected to a part of the vehicle power train driven at a rate proportional to the speed of the vehicle, and means associated with the pump drive and governed by said take-off means whereby as the speed of the vehicle increases the rate at which the pump is driven and hence the pressure suppliable by the pump is progressively reduced.

4. In an automotive vehicle equipped with power steering apparatus including a fluid motor and a pump for supplying pressure fluid to said motor, said pump having a capacity increasing with its speed and being operably connected to the crankshaft of the vehicle engine for being driven thereby, power take-off means driven by the output member of the vehicle transmission and operably connected with the pump drive whereby as the speed of the vehicle increases the rate at which the pump is driven and hence the pressure suppliable by the pump is progressively reduced.

References Cited in the file of this patent

UNITED STATES PATENTS

| | | |
|---|---|---|
| 1,395,001 | MacDonald | Oct. 25, 1921 |
| 1,827,117 | Staude | Oct. 11, 1931 |
| 1,926,692 | Tarbox | Sept. 12, 1933 |
| 2,033,920 | Centervall | Mar. 17, 1936 |
| 2,341,502 | Ingress | Feb. 8, 1944 |
| 2,356,492 | Smith | Aug. 22, 1944 |
| 2,487,618 | Twyman | Nov. 8, 1949 |